(12) United States Patent
Pursifull et al.

(10) Patent No.: US 6,378,493 B1
(45) Date of Patent: Apr. 30, 2002

(54) THROTTLE POSITION CONTROL SYSTEM

(75) Inventors: Ross Dykstra Pursifull, Dearborn; Benjamin David Sweet, Southfield, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/630,930

(22) Filed: Aug. 2, 2000

(51) Int. Cl.[7] ............................................... F02D 11/10
(52) U.S. Cl. ...................................................... 123/399
(58) Field of Search ............................ 123/339.21, 352, 123/361, 399; 180/179; 701/102

(56) References Cited

U.S. PATENT DOCUMENTS

| | | | | |
|---|---|---|---|---|
| 4,854,283 A | * | 8/1989 | Kiyono et al. | 123/361 |
| 4,941,444 A | * | 7/1990 | Fujita | 123/361 X |
| 5,213,077 A | * | 5/1993 | Nishizawa et al. | 123/361 X |

* cited by examiner

Primary Examiner—Tony M. Argenbright
(74) Attorney, Agent, or Firm—John E. Kajander

(57) ABSTRACT

An electronic throttle control system including a throttle valve for adjusting the amount of air drawn into the engine is disclosed. A throttle valve is controlled by a throttle position feedback controller which suspends an integration element when position error absolute value is greater than a threshold, or when the position rate absolute value is greater than another threshold. The integration element includes an integration increment such that generation of the integration increment begins by a determination made of the position error between the throttle position and the position command. Once a determination of the sign of position error is made, a gain is applied to the position error. Also, a gain is applied to the sign of position error. The integration element of the throttle position feedback controller then operates with the position error and the sign of position error. The throttle valve then reacts in response to the throttle position feedback controller.

11 Claims, 2 Drawing Sheets

THROTTLE POSITION CONTROL SYSTEM

The present invention relates generally to engine control systems, and more particularly to throttle position feedback controllers.

BACKGROUND

Many previously known motor vehicle throttle controls have a direct physical linkage between an accelerator pedal and the throttle body so that the throttle plate is pulled open by the accelerator cable as the driver presses the pedal. The direct mechanical linkage includes biasing that defaults the linkage to a reduced operating position, in a manner consistent with regulations. Nevertheless, such mechanisms are often simple and unable to adapt fuel consumption efficiency to changing traveling conditions, and add significant weight and components to the motor vehicle.

An alternate control for improving throttle control and the efficient introduction of fuel air mixtures into the engine cylinders is presented by electronic throttle controls. The electronic throttle control includes a throttle control unit that positions the throttle plate by an actuator controlled by a microprocessor based on the current operating state determined by sensors. The processors are often included as part of a powertrain electronic control that can adjust the fuel air intake and ignition in response to changing conditions of vehicle operation as well as operator control by driving springs that position the throttle valve.

Many electronic throttle control systems have position feedback controllers (see for example, U.S. Pat. No. 5,213,077/1993, U.S. Pat. No. 4,941,444/1990 and U.S. Pat No. 4,854,283/1989). Position feedback controllers or PID controllers (Proportional-Integral-Derivative) allow the control system to substantially maintain a setpoint by adjusting the control outputs. In an electronic throttle control system, the proportional and derivative elements position the throttle valve. The integration element primarily serves to drive system position error to zero. The higher the integral gain, the earlier the position error is driven out of the controller. However, position oscillation and integral windup limit integral gain. To clarify, system integrity is compromised with position oscillation because overshoot results. In addition, integrator windup occurs when the feedback controller exceeds the saturation limits of the system actuator and is unable to immediately respond to changes in the position error. That is, with windup, the position feedback controller exhibits lengthy settling times.

Many modern electronic throttle control systems use integration increments, generated by the integration elements, that are proportional to position error to drive out position error. However, this limits integral gain for small position error and allows position error to affect the system for a longer period of time and consequently decreases efficiency.

Many modern electronic throttle control systems also have their integration increment operating substantially continuously. This operation is inefficient because when the throttle is moving, the proportional and derivative terms of the position feedback controller position the throttle. Therefore, having the integrator active is wasted effort because the integrator will tend to wind up, and position error may occur when the integrator is then forced to unwind. Furthermore, when the throttle receives a new position command, the integrator winds up while the throttle is going to the new position and subsequently must wind down once the new position is attained. This unwinding sacrifices performance. In addition, when the throttle mechanism encounters an obstruction to operation (e.g. ice on the throttle valve), the integrator will tend to wind up and then, when a non-obstructed position is commanded, the integrator term unwinds and large position errors may result.

The disadvantages associated with these conventional position feedback controller techniques have made it apparent that a new technique for position feedback control is needed. The new technique should have minimal position oscillation and minimal integral windup and should also have a high integral gain. The present invention is directed to these ends.

SUMMARY OF THE INVENTION

It is an object of the present invention to provide an improved position feedback controller. It is also an object of the present invention to provide an improved position feedback controller for an electronic throttle control system.

In accordance with the present invention, an electronic throttle control system including a throttle valve for adjusting the amount of air drawn into the engine is disclosed. The throttle valve is controlled by a throttle position feedback controller which is adapted to suspend an integration element when position error absolute value is greater than a threshold, or when the position rate absolute value is greater than another threshold. The integration element includes an integration increment such that generation of the integration increment begins by a determination made of the position error between the throttle position and the position command. Once a determination of the sign of position error is made, a gain is applied to the position error. Also, a gain is applied to the sign of position error. The integration element of the throttle position feedback controller then operates with the position error and the sign of position error. The throttle valve then reacts in response to the throttle position feedback controller.

Additional advantages and features of the present invention will become apparent from the description that follows and may be realized by the instrumentalities and combinations particularly pointed out in the appended claims, taken in conjunction with the accompanying drawings.

BRIEF DESCRIPTION OF THE DRAWINGS

For a more complete understanding of the invention, there will now be described some embodiments thereof, given by way of example, reference being made to the accompanying drawings, in which.

DETAILED DESCRIPTION

The present invention is illustrated with respect to an electronic throttle control system 10, particularly suited to the automotive field. However, the present invention is applicable to various other uses that may require electronic control systems, as will be understood by one skilled in the art.

Figure 1:
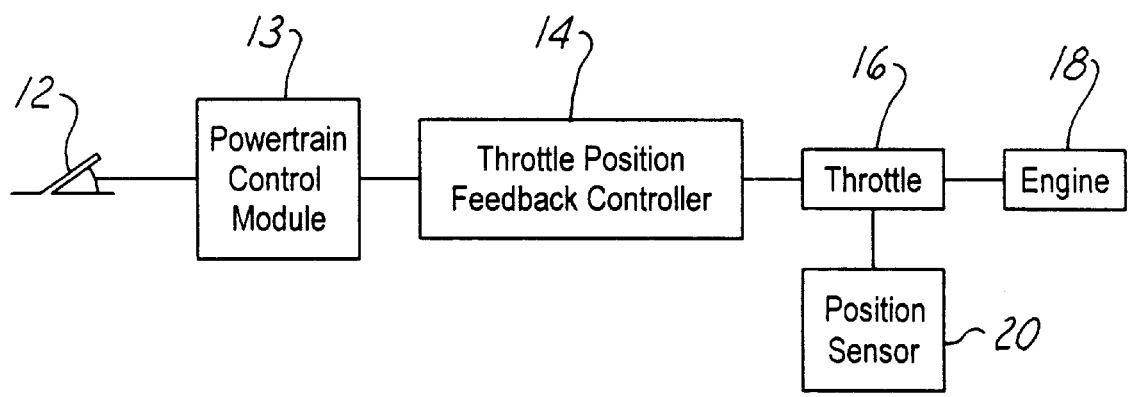
FIG. 1 is a schematic diagram of an electronic throttle control system.

Referring to FIG. 1, an electronic throttle control system 10 in accordance with one embodiment of the present invention is illustrated. The electronic throttle control system 10 activates from a position command 12 through a powertrain control module (PCM) 13. Typically, the position command 12 is derived from an accelerator pedal. The PCM 13 regulates the powertrain of the vehicle in response to the position command 12. The electronic throttle control system 10 further includes a throttle position feedback controller 14 that has a system for suspending an integration element and controlling the integration increment, which will be discussed later. The electronic throttle control system 10 further includes a throttle 16 for adjusting an amount of air drawn into an engine 18. A sensor 20 is attached to the throttle 16 and measures the actual throttle position.

In operation, the position command 12 is first taken into account and fed into the PCM 13. The throttle position feedback controller 14, operating with the sensor 20, subsequently activates to open and close the throttle 16 with a substantially short interval between the position command 12 and the throttle 16 positioning that approximates that position command 12. The throttle 16 then conducts air into the engine 18 permitting the engine 18 to accelerate and decelerate.

Figure 2:
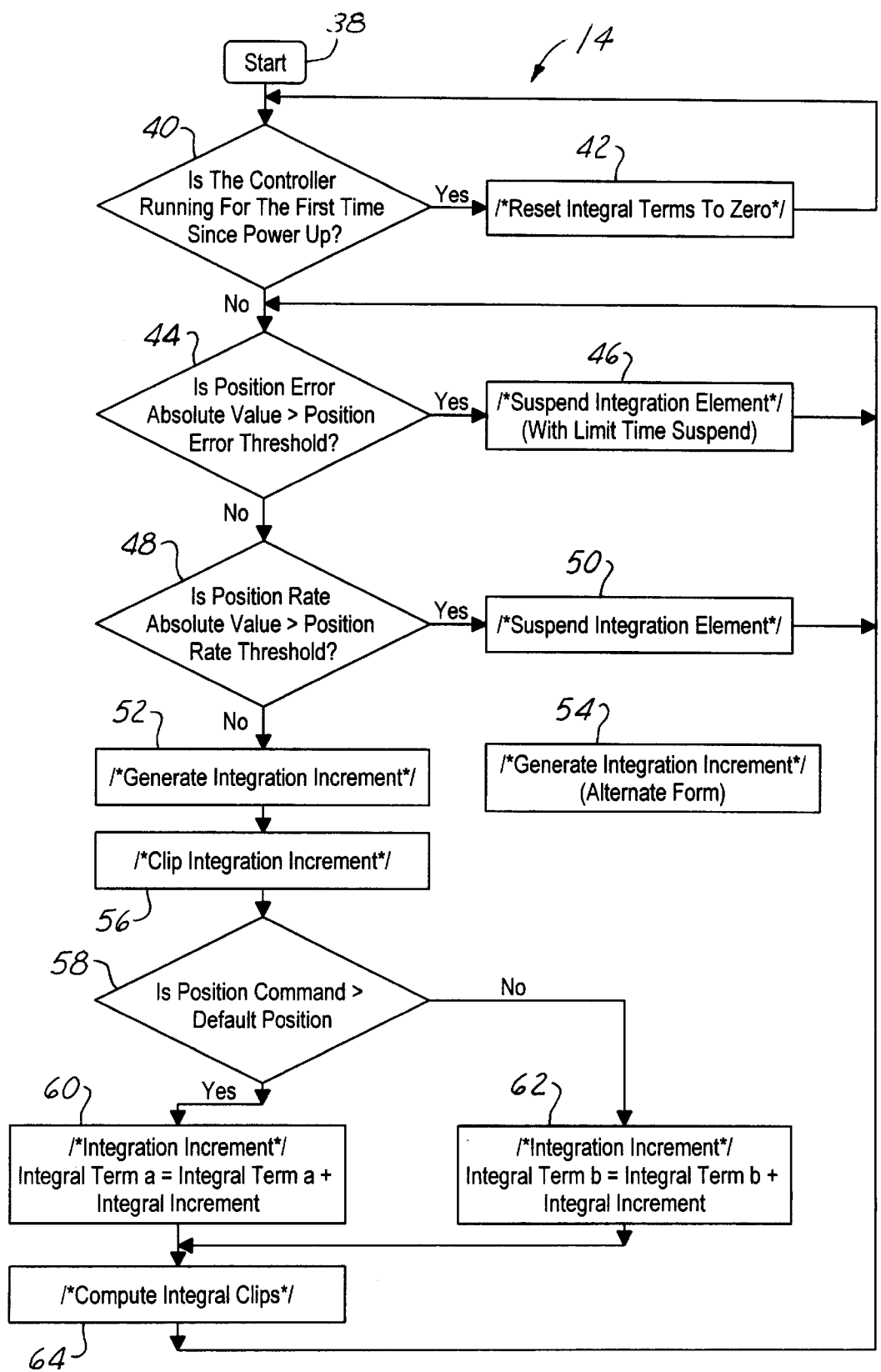
FIG. 2 is a logic flow diagram of an electronic throttle feedback controller for an electronic throttle control system which is responsive to a position command in accordance with one embodiment of the present invention.

Referring to FIG. 2 in view of FIG. 1, a logic flow diagram of the operation of an electronic throttle feedback controller 14 for an electronic throttle control system 10 in accordance with one embodiment of the present invention is illustrated. The electronic throttle feedback controller 14 is responsive to a position command 12. The logic starts by inputting the position command 12. After the start 38 of the program shown in FIG. 2, a check is made in inquiry block 40 as to whether the controller is running for the first time since power up (control system activation). The position error is usually large following the initial input and this causes the integral to wind up. As a result, time is wasted waiting for the integral to unwind for normal control operation. For a positive answer, the terms of the integration element are reset to zero pursuant to the operation block 42, and the control method goes through the inquiry block 40 again to obtain a negative response.

Otherwise, a check is made in inquiry block 44 as to whether the position error absolute value is greater than the position error threshold. The position error absolute value is determined by computing the absolute difference between the present throttle position as measured by the throttle position sensor 20 and the desired throttle position corresponding to the position command 12. The throttle position error threshold is the maximum amount of error allowed for the position error under which the integration element operates efficiently. To clarify, when the position error is large, the proportional and derivative control elements of the position feedback controller are controlling the electronic throttle 16. This large position error will substantially cause the integration element to start winding up if the integration element is active. Efficiency is sacrificed when the integration element subsequently unwinds from the integration element wind-up. An affirmative answer suspends the integration element pursuant to the operation block 46 until the answer is negative. However, the operation block 46 includes a protective time-out for the integration element. This protective time-out prevents the integration element from elimination from the electronic throttle position feedback controller 14. This elimination from the electronic throttle position feedback controller 14 tends to happen when the proportional element of the electronic throttle position feedback controller 14 does not bring the throttle within the integration element active range. The protective time-out is preferably calibrated to activate the integration element immediately after the proportional and derivative elements pass the typical zero to ninety-five percent response time. The time-out also has an internal timer which resets the time-out preferably when the position error goes through a sign change.

In inquiry block 48, a check is made as to whether the position rate absolute value is greater than the position rate threshold. The position rate absolute value is determined by first taking the difference between the current throttle position and the previous throttle position. Subsequently, this difference is divided by the time elapsed between the current throttle position and the previous throttle position (time elapsed is typically a constant known as control loop time). The absolute value is taken of the result of the division to calculate the position rate absolute value. The throttle position rate threshold is the maximum amount of position rate that can be associated with the integration element. To clarify, when the position rate is large, the proportional and derivative control elements of the position feedback controller 14 are controlling the electronic throttle 16, and this large position rate will substantially cause the integration element to start winding up. Efficiency is sacrificed when the integration element subsequently unwinds. For a positive answer, the integration element is suspended pursuant the operation block 50 until the answer is negative.

In operation block 52, the integration element of the throttle position feedback controller 14 is driven which computes the integration increment. Preferably, this portion of the controller operates by a determination of the position error element and the sign of position error element of the throttle position feedback controller. The sign of position error is determined by whether the throttle 16 position is greater than or less than the desired throttle 16 position. Preferably also, a position error gain element of the throttle position feedback controller 14 is added. This gain element multiplies the position error. Preferably, a sign of position error gain element of the throttle position feedback controller 14 is also added. This gain element multiplies the sign of position error. In one embodiment of the electronic throttle control system 10, this portion of the controller operates by computing the integration increment (integral_increment) as a maximum of a multiple of a first constant ($K_1$) and the position error gain (I) applied to the position error element (position_error) and a multiple of a second constant ($K_2$) and the sign of position (position_error_sign) error gain (I_sign) applied to the sign of position error element. The first and second constants depend on the parameters of the electronic throttle control system 10. For example, the parameters differ when an alternate spring is used in the electronic throttle control. Operation block 52 is illustrated by the following equation:

$$\text{integral\_increment} = \text{maximum of} \left\{ \begin{array}{l} (\text{position\_error} \times K_1 I) \\ (\text{position\_error\_sign} \times K_2 I\_\text{SIGN}) \end{array} \right\} \quad (1)$$

In an alternate embodiment of the electronic throttle control system 10, from the operation block 54, the integration increment is generated by adding a multiple of the first constant and the position error gain applied to the position error element to a multiple of the second constant and the sign of position error gain applied to the sign of position error element. Operation Block 54 is illustrated by the following equation:

$$\text{integral\_increment} = (\text{position\_error} \times K_1 I) + (\text{position\_error\_sign} \times K_2 I\_\text{SIGN}) \quad (2)$$

Following the generation of the integration increment in operation block 52 (or in operation block 54), operation block 56 becomes active. This clips, or limits, the maximum and minimum operating regions of the integration increment.

The throttle 16 has springs and combinations of springs such that drive the throttle plate to a position between open throttle 16 and closed throttle 16 called "default". When the throttle position feedback controller 14 is commanding a position between closed throttle 16 and default, this is referred to a position "b" (below default). When the throttle position feedback controller 14 is commanding a position between default and open throttle 16, this is referred to as position "a" (above default). Because the spring force driving the throttle 16 open to default and the spring force driving the throttle 16 to closed default can differ from each other (due to design intent, manufacturing differences, temperature effects, aging), a separate integral term is maintained for each region. Depending on whether the position command 12 is above (region a) or below (region b) the default position, the throttle position feedback controller 14 determines which integral term actively updates and is used to control the throttle 16. The throttle position feedback controller 14 uses one term at a given time (either a or b). A more complex mechanism could be treated by breaking up the operating regions into multiple sub-regions and applying integral terms for those areas. The idea is that on either side of discontinuities, like the default position, improved performance is achieved by using a separate integral term for each region. For this invention, the regions are bordered by spring torque (or force) discontinuities.

In inquiry block 58, a check is made as to whether the position command is greater than the "a" default term. If so, the logic continues to operation block 60, and the electronic throttle feedback controller 14 sets the integration upper limit term "a" to the current integration upper limit term "a" added to the integration increment. Otherwise, if the position command is below default term "b", operation block 62 becomes active, and the electronic throttle feedback controller 14 sets the integration lower limit term "b"to the current integration lower limit "b" added to the integration increment. The resetting of the integration element terms is done because, within the default region, or spring torque discontinuity, large errors occur, so this safety is designed in the system to control the system substantially outside of the range where the errors exist.

Subsequently, operation block 64 becomes active. Operation block 64 sets a maximum control effort by first computing the range of the maximum control effort and then by clipping both a maximum and a minimum of the integration element within a range of the maximum control effort. That is, integral terms "a" and "b" are clipped. This is done because the system does not become substantially more efficient operating outside of this range. Parameters are set by a determination of system variability.

From the foregoing, it can be seen that there has been brought to the art a new and improved electronic throttle control system 10. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims:

What is claimed is:

1. A control method for an electronic throttle control system including a feedback controller having an integration element with an integration increment, the method comprising the steps of:

inputting a position command to the electronic throttle control system;

measuring throttle position;

calculating a position error between said position command and said throttle position;

calculating an integral increment based on said position error;

determining a position error absolute value of the electronic throttle control system;

suspending the integration element when said position error absolute value is greater than a position error threshold;

determining a position rate absolute value of the electronic throttle control system;

suspending the integration element when said position rate absolute value is greater than a position rate threshold; and computing the integration increment of the integration element when a proportional term of the electronic throttle control system brings a position rate within a desired value.

2. The method as recited in claim 1, wherein said steps of suspending include the step of tracking an amount of time the integration element has been inactive to prevent elimination of the integration element from the electronic throttle control system.

3. The method as recited in claim 1, wherein the step of computing includes the step of determining an applicable integration element term depending on the operating range determined by said position command.

4. The method as recited in claim 1, wherein the step of computing includes the step of resetting the integration element feedback control terms to zero when the electronic throttle control system is initialized.

5. The method as recited in claim 1, wherein the step of computing includes the step of limiting the integration element to a maximum control effort by clipping both a maximum and a minimum of the integration element within a range of said maximum control effort.

6. A method for computing an integration increment for an electronic throttle control system having a position command and a throttle position feedback controller having a position error element, a position error gain, a sign of position error element and a sign of position error gain element, the method comprising the steps of:

determining the position error element of the throttle position feedback controller in relation to the position command;

determining the position error gain of the throttle position feedback controller;

determining the sign of position error element of the throttle position feedback controller in relation to the position command;

determining the sign of position error gain of the throttle position feedback controller;

operating the position error element with the position error gain and a first constant; and operating the sign of position error element with the sign of position error gain and a second constant, thereby computing the integration increment for the electronic throttle control system.

7. The method as recited in claim 6, wherein the step of operating the position error element or the sign of position error element includes the step of adding a multiple of said first constant and the position error gain applied to the position error element to a multiple of said second constant and the sign of position error gain applied to the sign of position error element.

8. The method as recited in claim 6, wherein the step of operating the position error element or the sign of position error element includes the step of limiting the integration increment to a maximum of a multiple of said first constant and the position error gain applied to the position error element and a multiple of said second constant and the sign of position error gain applied to the sign of position error element.

9. An electronic throttle control system for a vehicle comprising:
   a throttle position feedback controller adapted to suspend an integration element when a position error absolute value is greater than a position error threshold,
   and further adapted to suspend an integration element when a position rate absolute value is greater than a position rate threshold, said integration element including an integration increment, said throttle position feedback controller programmed to generate said integration increment by determining a position error in relation to a position command, determining a sign of position error in relation to said position command, determining a position error gain, determining a sign of position error gain, operating said position error with said position error gain and a first constant, and operating said sign of position error with said sign of position error gain and a second constant; and
   a throttle valve for adjusting an amount of air drawn into an engine, said throttle valve responsive to said throttle position feedback controller.

10. The system as recited in claim 9, wherein said integration element forces said position error and said sign of position error to operate with said sign of position error gain by adding a multiple of said position error element and said position error gain to a multiple of said sign of position error element and said sign of position error gain.

11. The system as recited in claim 9, wherein said integration element forces said position error and said sign of position error to operate with said sign of position error gain by limiting said integration increment to a maximum of said position error gain applied to said position error element and said sign of position error gain applied to said sign of position error element.

* * * * *

UNITED STATES PATENT AND TRADEMARK OFFICE
CERTIFICATE OF CORRECTION

PATENT NO. : 6,378,493 B1
DATED : April 30, 2002
INVENTOR(S) : Ross Dykstra Pursifull et al.

It is certified that error appears in the above-identified patent and that said Letters Patent is hereby corrected as shown below:

Column 7,
Line 22, delete "5"

Signed and Sealed this

Twenty-eighth Day of September, 2004

JON W. DUDAS
*Director of the United States Patent and Trademark Office*